United States Patent [19]

Ekola

[11] Patent Number: 4,784,004
[45] Date of Patent: Nov. 15, 1988

[54] WEB TENSION TRANSDUCER

[76] Inventor: Kenneth E. Ekola, 574 - 6th St., Dover, N.H. 03820

[21] Appl. No.: 87,399

[22] Filed: Aug. 20, 1987

[51] Int. Cl.⁴ .............................................. G01L 5/10
[52] U.S. Cl. .................................................. 73/862.48
[58] Field of Search ........... 73/862.48, 862.54, 862.55, 73/862.56, 862.07

[56]  References Cited

U.S. PATENT DOCUMENTS 4,015,468  4/1977  Simon ......................... 73/862.48 X
4,281,539  8/1981  Keller ................................ 73/862.54

Primary Examiner—Charles A. Ruehl
Attorney, Agent, or Firm—Davis, Bujold & Streck

[57]  ABSTRACT

A combined roll/tension transducer for supporting a moving web while sensing the tension thereof. There is a rigid support shaft and a pair of roll support and signal generating assemblies disposed adjacent the respective ends of the shaft. The assemblies each comprise a collar non-movingly attached to the shaft; a pair of resiliently bendable opposed beams carried by the collar and extending therefrom parallel to opposite sides of the shaft; a cylindrical support member disposed over the shaft and carried by the pair of beams, the support member having an axial bore with the shaft passing therethrough which is a clearance fit to the shaft; a ball bearing fit onto the outer periphery of the support member; and, a plurality of strain gauges disposed on the upper and lower surfaces of respective ones of the pair of beams to provide signals at outputs thereof indicating the strain in each of the strain gauges. A cylindrical roll is disposed over and between the ball bearings to be supported for rolling motion thereby.

In the preferred embodiment, the collars are disposed between the cylindrical support members. The shaft is shown supported on both ends or cantilevered from a support on onlyone end.

16 Claims, 3 Drawing Sheets

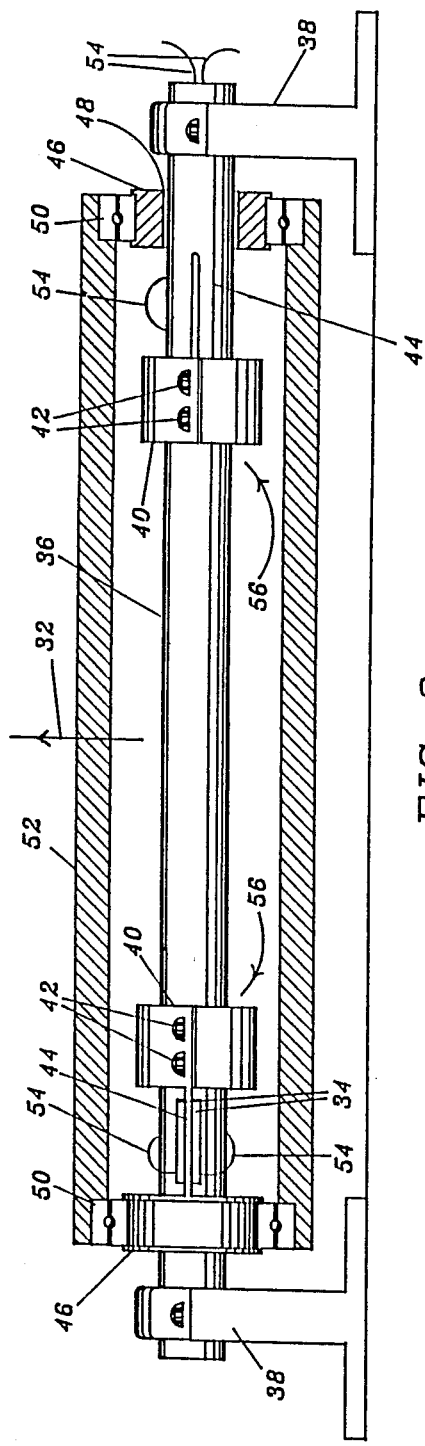
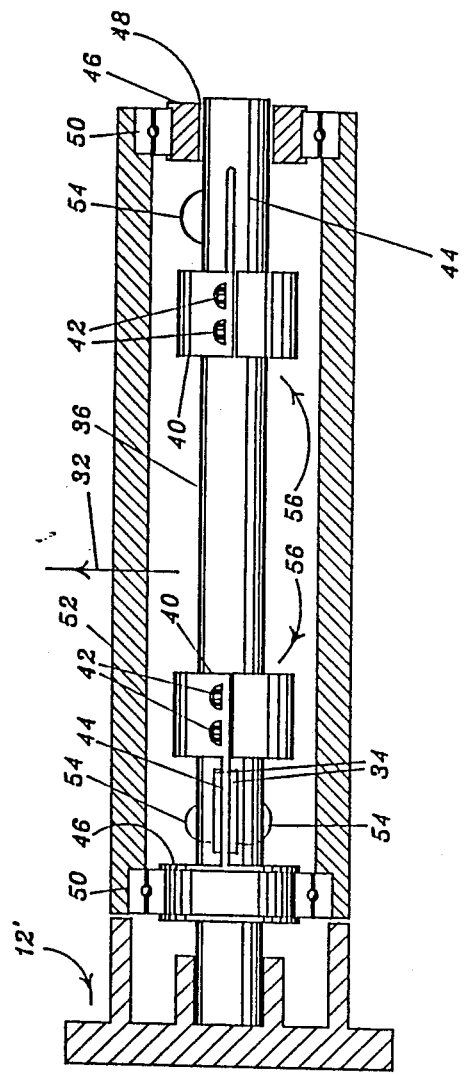
FIG. 3
FIG. 4

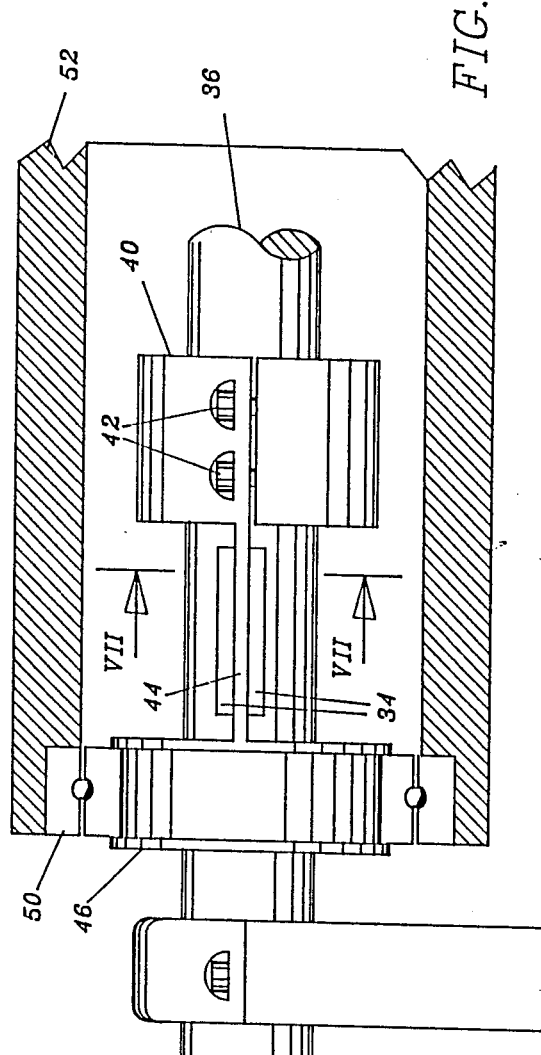
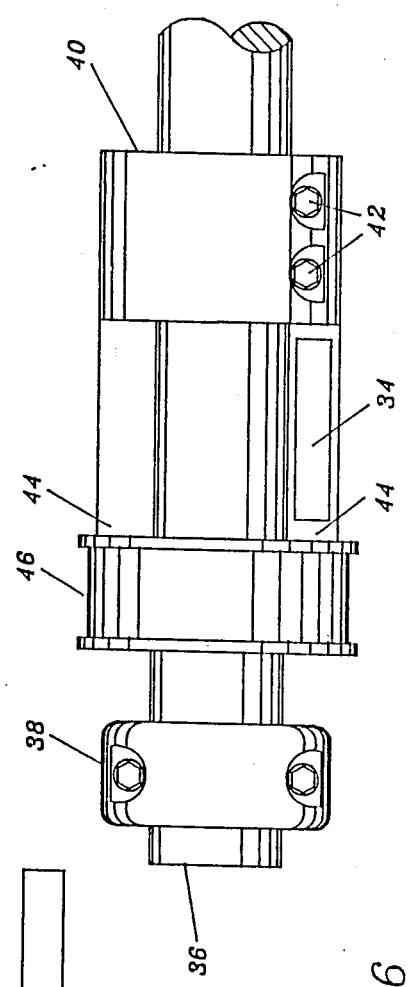
FIG. 5
FIG. 6

WEB TENSION TRANSDUCER

BACKGROUND OF THE INVENTION

The present invention relates to apparatus for guiding a moving web in tension and, more particularly, to apparatus to be used in spaced combinations of two or more for supporting a roll on a shaft and providing a signal output reflecting force on the roll at the points of support comprising, a collar non-movingly attached to the shaft; a pair of resiliently bendable opposed beams carried by the collar and extending therefrom parallel to opposite sides of the shaft; a cylindrical support member disposed over the shaft and carried by the pair of beams, the support member having an axial bore for the shaft to pass through which is a clearance fit to the shaft; a ball bearing fit onto the outer periphery of the support member and having an outer diameter sized to have the roll slid thereover to be supported for rotation thereby; and, a plurality of strain gauges disposed on the upper and lower surfaces of respective ones of the pair of beams to provide signals at outputs thereof indicating the strain in each of the strain gauges.

Tension transducers are well known in the art and are manufactured and sold commercially by a number of companies including the applicant's company, Dover Flexo Electronics, Inc. A web tension transducer is used to measure tension in any moving web. The output signal produced can be displayed for manual control of the tension or can be used for automated control. They are typically used in printing presses, coaters, laminators, textile machines, slitter-rewinders, sheeters, paper-making machines, and any other machines which in some way processes a continuous web of paper, plastic film, metal, textile, non-woven textile, felt, rubber, or any combination of the foregoing. Variations of web tension can cause web breakage, slack web, wrinkling, curling, stretching, and in general, poor quality product and excessive waste. These problems can be eliminated by proper control of web tension. The basis of proper control is tension measurement. The basis of measurement is a transducer which will convert a force (web tension) into an electrical signal which can be used for control purposes. The transducer must be accurate regardless of web speed and tension or it will not allow the correction of the aforementioned problems.

Tension transducers can be placed into two general classifications. In one instance, as typified by co-pending application Ser. No. 870,113, filed June 3, 1986 (U.S. Pat. No. 4,691,579) by applicant herein entitled TENSION TRANSDUCER and assigned to the assignee of this invention, the transducer is incorporated into a supportive joint used to support a rotating or non-rotating shaft having the roll over which the web is moving mounted thereof. The joints are used in pairs on the outside of the roll.

A prior art approach to the second general classification as wherein the present invention is applicable is shown in FIGS. 1 and 2. In this case, the transducer is incorporated within the roll instead of being on the outside as part of a supportive joint. In the prior art idler roll/transducer 10 of FIGS. 1 and 2, there is a hollow mounting flange 12 by which the roller/transducer 10 can be mounted to a side surface (not shown) of the apparatus into which it is incorporated. A first steel shaft 14 extends outward rigidly and perpendicularly to the flange 12. An elongated, cylindrical, aluminum beam member is concentrically attached to the end of the shaft 14 as with allen screws 18 passing from inside the flange 12 through bores (not shown) in the steel shaft 14 into threaded engagement with the beam member 16. A second steel shaft 20 is concentrically fit into the other end of the beam member 16 and extends rigidly outward therefrom. The two ends of the beam member 16 at 22 are cylindrical and have a bearing 24 press-fit thereon. Each end 22 has a bore 26 therethrough through which the shafts 14, 20 pass, respectively. The bores 26 are a close-clearance fit to the shafts 14, 20 to allow for deflection movement. Adjacent each end, a pair of opposed beams 28 are formed into the beam member 16. A cylindrical stainless steel roll 30 is fit over the bearings 24 to roll thereon. The web in which the tension is to be controlled passes over the roll 30 and the roll/transducer 10 is positioned so that the force of the web is in the direction of the arrows 32. A pair of strain gauges 34 are disposed on the upper and lower surfaces of the inward beams 28 with respect to the direction of applied force. The force of the web against the roll 30 applies a force through the bearings 24 against the beam ends 22 causing them to deflect the beams 28 and impart a strain into the strain gauges 34 which, in turn, produce an electrical signal which can be used for control.

As can be appreciated from a review of the prior art apparatus of FIGS. 1 and 2, there is a high potential for non-linearity and part failure because of the use of dissimilar metals and the composite construction of the central member comprising the steel shafts 14, 20 and aluminum beam member 16. The amount of deflection movement being measured is so small that any minor misalignment, free play, or failure in one or both of the joints between the shafts 14, 20 and the beam member can cause catastrophic failure and/or inaccuracies in the use of the prior art roll/transducer 10.

As can also be appreciated, the above-described construction does not lend itself to a wide variety of sizes of easy manufacture. To produce a different width of roll 30, a corresponding beam member 16 of like size must be constructed as well. As can be seen and appreciated, the beam member 16 is of complex construction and not quickly and economically manufacturable in a new length.

Wherefore, it is the object of the present invention to provide a combined roll/transducer for web support and tension measurement which is easily manufactured in varying widths.

It is another object of the present invention to provide a web tension roll/transducer where the transducers are located within the roll but wherein a through shaft of unitary construction is employed.

Other objects and benefits of the present invention will become apparent from the description contained hereinafter taken in conjunction with the drawing figures which accompany it.

SUMMARY

The foregoing objects have been attained by the combined roll/tension transducer of the present invention. There is a rigid support shaft, means for supporting the support shaft, and a pair of roll support and signal generating assemblies disposed adjacent the respective ends of the shaft. The assemblies each comprise, a collar non-movingly attached to the shaft; a pair of resiliently bendable opposed beams carried by the collar and extending therefrom parallel to opposite sides of the shaft;

a cylindrical support member disposed over the shaft and carried by the pair of beams, the support member having an axial bore with the shaft passing therethrough which is a clearance fit to the shaft; a ball bearing fit onto the outer periphery of the support member; and a plurality of strain gauges disposed on the upper and lower surfaces of respective ones of the pair of beams to provide signals at outputs thereof indicating the strain in each of the strain gauges. A cylindrical roll is disposed over and between the ball bearings to be supported for rolling motion thereby.

In the preferred embodiment, the collars are disposed between the cylindrical support members. The shaft can be supported on both ends or cantilevered from a support on only one end.

Also in the preferred embodiment, the roller bearings are self-aligning ball bearings whereby any bending couple at the ends of the beams is eliminated and linearity is improved and the collar, the pair of resiliently bendable opposed beams and the cylindrical support member are of unitary construction.

DESCRIPTION OF THE DRAWINGS

FIG. 3 is a partially cutaway longitudinal view of the present invention in a first embodiment wherein the through shaft is supported on both ends.

FIG. 4 is a partially cutaway longitudinal view of the present invention in a second embodiment wherein the roll is cantilevered from one end.

FIG. 5 is an enlarged cutaway drawing of one end of the apparatus of FIG. 3.

FIG. 6 is a top view of the apparatus of FIG. 5.

DESCRIPTION OF THE PREFERRED EMBODIMENT

Figure 1:
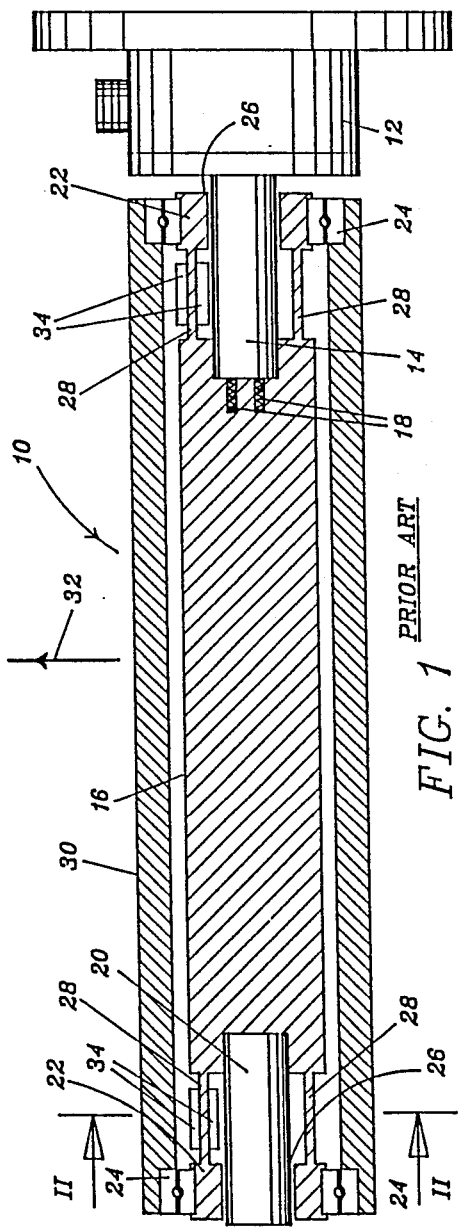
FIG. 1 is a partially cutaway longitudinal view of a prior art web tension roll/transducer.
Figure 7:
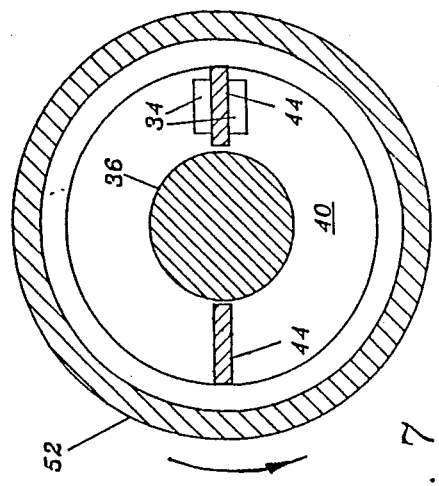
FIG. 7 is a cutaway end view of the apparatus of FIG. 5 in the plane VII—VII.
Figure 2:
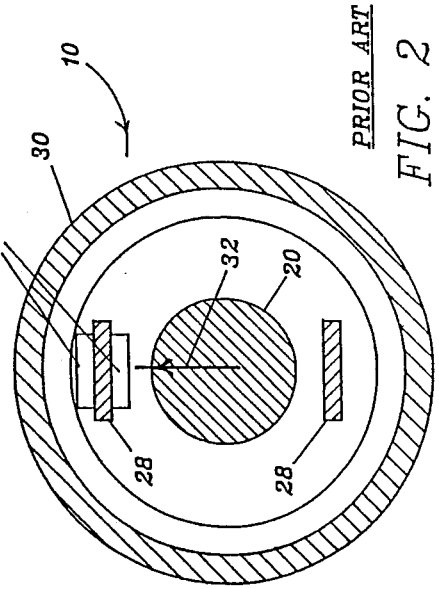
FIG. 2 is a cutaway end view of the roll/transducer of FIG. 1 in the plane II—II.

The present invention is shown in FIG. 3 in an embodiment wherein the through shaft or rigid support staff 36 employed therein is supported on both ends by support clamps 38. It is also shown in FIG. 4 in a cantilevered version wherein the through shaft 36 is supported only on one end by a mounting flange 12' similar to that of the prior art constructions of FIGS. 1 and 2. Except for the method of mounting the through shaft 36, the two embodiments are substantially identical, and therefore, the balance of the description of the construction will be non-specific as to which embodiment is being employed.

The heart of the present invention is the through shaft 36 of steel which passes entirely through the apparatus. The shaft 36 is gripped rigidly to be non-rotating. A pair of collars or clamps 40 are clamped to the shaft 36 adjacent each end. Clamps 40 can be of two parts or of one piece with a slit in one side. A one-piece construction as shown in the drawing figures is preferred with the clamp being tightly clamped onto the shaft 36 as with allen screws 42. A pair of opposed horizontal beams 44 extend outward from each of the clamps 40 along the sides of the shaft 36. The beams 44 are disposed radially at 90° to the direction of intended web tension as indicated by the arrows 32. A cylindrical support member 46 is mounted to each of the opposite ends of the beams 44. Each of the cylindrical members 46 has a bore 48 therethrough which is a close-clearance fit to the shaft 36. In the tested embodiments of applicant herein, 0.008 inches of clearance is preferred. As should be appreciated, this arrangement provides a safety support for the shaft 36 in the event of extraordinary tension and deflection. Bearings 50 are mounted on the cylindrical members 46 and a stainless steel roll 52 is disposed over the bearings 50. Each of the four beams 44 can have strain gauges 34 attached to the upper and lower surfaces thereof. In the preferred embodiment strain gauges 34 are attached to the upper and lower surfaces of two beams located diagonally opposite each other at each end of the shaft 36. In the preferred embodiment, the shaft 36 is provided with longitudinal and radial bores therein (not shown) through which the wires 54 from the strain gauges 34 can be routed to the outside. In use, force against the roll 52 is translated into deflection movement of the beams 44 resulting in signals from each of the four strain gauges 34 which can be processed to provide an accurate picture of the tension within the web. Since there is a tension-measuring element in each end of the roll 52, the outputs can be summed and the total represents total web tension. This has the effect of averaging the web tension and eliminates inaccuracies caused by differences in web tension, width, and tension profile. Overall accuracy is the same as a system using two standard external transducers and a separate idle roll.

A collar 40, a pair of resiliently bendable opposed beams 44 carried by the collar 40, a cylindrical support member 46, a bearing 50 fitted onto the outer periphery of the support member 46 and a plurality of strain gauges 34 all combine to comprise a roll of support and signal generating assembly.

As should be noted and appreciated, the tension-measuring elements or beam assemblies generally indicated as 56 and comprising, in each case, a clamp 40, a pair of connecting beams 44 with strain gauges 34 thereon and the cylindrical member 46 are modular and can be made in several different load ratings. This provides the ability to have a large variety of load/width combinations with a minimum of different parts. It should also be noted that the roll 52 and shaft 36 are of simple construction and that the beam assemblies 56 can be slid along and clamped to the shaft 36 at an infinite number of points. Thus, to change width, only a new roll 52 and shaft 36 are required.

It should also be noted by those skilled in the art that with the above-described construction of the present invention, no mechanical preload is experienced with changes in temperature. Temperature compensation is provided by allowing axial movement of the roll on the beam assembly without changing the load point on the beam which would cause inaccuracy. In the preferred embodiment, the bending couple at the free end of the beam is eliminated by using a self-aligning ball bearing instead of the usual deep-groove ball bearing employed in the prior art, which results in markedly improved linearity.

Wherefore, having thus described my invention, I claim:

1. A combined roll/tension transducer comprising:
   (a) a rigid support shaft;
   (b) means for supporting said support shaft;
   (c) a first collar non-movingly attached to said shaft adjacent one end thereof;

(d) a first pair of resiliently bendable opposed beams carried by said first collar and extending therefrom parallel to opposite sides of said shaft;

(e) a first cylindrical support member disposed over said shaft adjacent said one end and carried by said first pair of beams, said first support member having an axial bore disposed over said shaft which is a clearance fit to said shaft;

(f) a second collar non-movingly attached to shaft adjacent the other end thereof;

(g) a second pair of resiliently bendable opposed beams carried by said second collar and extending therefrom parallel to opposite sides of said shaft;

(h) a second cylindrical support member disposed over said shaft adjacent said other end and carried by said second pair of beams, said second support member having an axial bore disposed over said shaft which is a clearance fit to said shaft;

(i) a pair of bearings fitted onto the outer periphery of respective ones of said first and second support members;

(j) a cylindrical roll disposed over and between said bearings to be supported for rolling motion thereby; and (k) a plurality of strain gauges disposed on the upper and lower surfaces of at least one of each of said first and second pair of beams to provide signals at outputs thereof indicating the strain in each of said strain gauges induced by tension against said roll.

2. The combined roll/tension transducer of claim 1 wherein:
said first and second collars are disposed between said first and second cylindrical support members.

3. The combined roll/tension transducer of claim 1 wherein said means for supporting said support shaft comprises:
a pair of supports attached to said shaft at the respective ends thereof with said first and second collars and said first and second cylindrical support members disposed therebetween.

4. The combined roll/tension transducer of claim 1 wherein said means for supporting said support shaft comprises:
a single support attached to said shaft at one end thereof with the adjacent said collar and said cylindrical support member disposed more inwardly on said shaft therefrom whereby said shaft is supported in cantilever.

5. The combined roll/tension transducer of claim 1 wherein:
said bearings are self-aligning ball bearings whereby any bending couple at the ends of said beams is eliminated and linearity is improved.

6. The combined roll/tension transducer of claim 1 wherein:
said collar, said pair of resiliently bendable opposed beams and said cylindrical support member in each case are of unitary construction.

7. A combined roll/tension transducer according to claim 1 characterized in that strain gauges are attached to the upper and lower surfaces of two of said beams located diagonally opposite each other, one at each end of the shaft.

8. A combined roll/tension transducer comprising:
(a) a rigid support shaft;
(b) means for supporting said support shaft;
(c) a pair of roll support and signal generating assemblies disposed adjacent the respective ends of said shaft, said assemblies each comprising,
(c1) a collar non-movingly attached to said shaft;
(c2) a pair of resiliently bendable opposed beams carried by said collar and extending therefrom parallel to opposite sides of said shaft;
(c3) a cylindrical support member disposed over said shaft and carried by said pair of beams, said support member having an axial bore with said shaft passing therethrough which is a clearance fit to said shaft;
(c4) a bearing fitted onto the outer periphery of said support member;
(c5) a plurality of strain gages disposed on the upper and lower surfaces of at least one of each of said pair of beams to provide signals at outputs thereof indicating the strain in each of said strain gauges; and
(d) a cylindrical roll disposed over and between said bearings to be supported for rolling motion thereby.

9. The combined roll/tension transducer of claim 8 wherein:
said collars are disposed between said cylindrical support members.

10. The combined roll/tension transducer of claim 8 wherein said means for supporting said support shaft comprises:
a pair of supports attached to said shaft at the respective ends thereof with said collars and said cylindrical support members disposed therebetween.

11. The combined roll/tension transducer of claim 8 wherein said means for supporting said support shaft comprises:
a single support attached to said shaft at one end thereof with the adjacent said collar and said cylindrical support member disposed more inwardly on said shaft therefrom whereby said shaft is supported in cantilever.

12. The combined roll/tension transducer of claim 8 wherein:
said bearings are self-aligning ball bearings whereby any bending couple at the ends of said beams is eliminated and linearity is improved.

13. The combined roll/tension transducer of claim 8 wherein:
said collar, said pair of resiliently bendable opposed beams and said cylindrical support member are of unitary construction.

14. Apparatus to be used in spaced combinations of two or more for supporting a roll on a shaft and providing a signal output reflecting tension on the roll at the points of support comprising:
(a) a collar non-movingly attached to the shaft;
(b) a pair of resiliently bendable opposed beams carried by said collar and extending therefrom parallel to opposite sides of the shaft;
(c) a cylindrical support member disposed over the shaft and carried by said pair of beams, said support member having an axial bore for the shaft to pass through which is a clearance fit to the shaft;
(d) a roller bearing fitted onto the outer periphery of said support member and having an outer diameter sized to have the roll slid thereover to be supported for rotation thereby; and,
(e) a plurality of strain gauges disposed on the upper and lower surfaces at least one of each of said pair of beams to provide signals at outputs thereof indicating the strain in each of said strain gauges.

15. The apparatus of claim 14 wherein:
said roller bearing is a self-aligning ball bearing whereby any bending couple at the ends of said beams is eliminated and linearity is improved.

16. The apparatus of claim 14 wherein:
said collar, said pair of resiliently bendable opposed beams and said cylindrical support member are of unitary construction.

* * * * *